Feb. 2, 1937.  M. HANSSON  2,069,306
FUEL INJECTION CONTROL
Filed Aug. 6, 1934  3 Sheets-Sheet 1
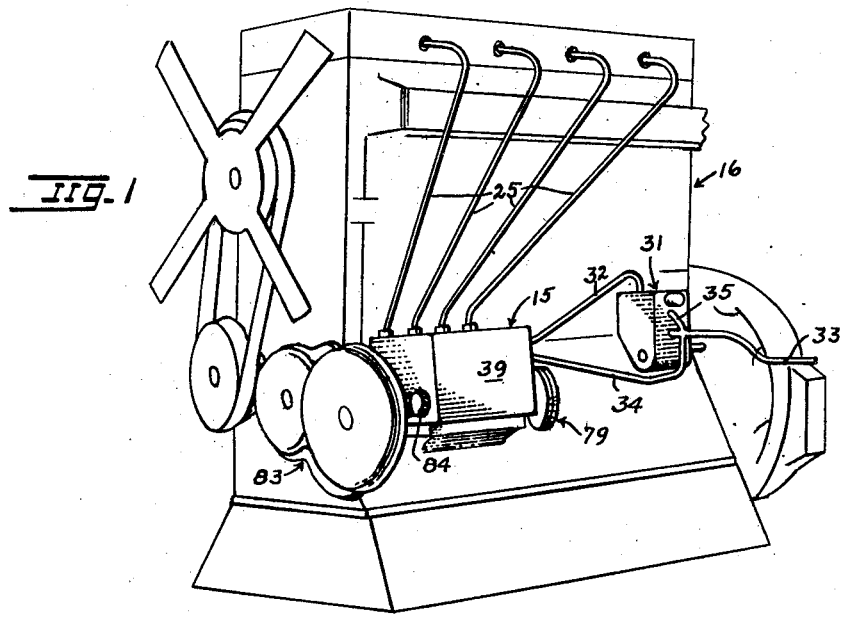
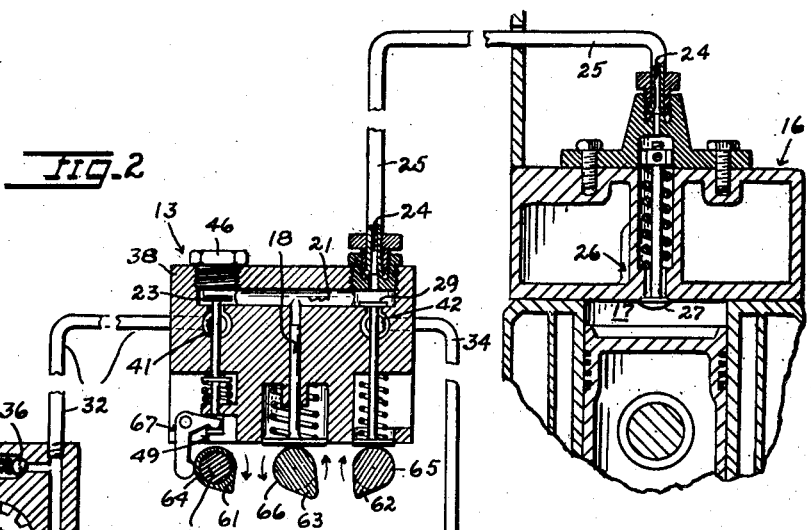
INVENTOR.
MALTE HANSSON
BY Henry N. Young.
ATTORNEY

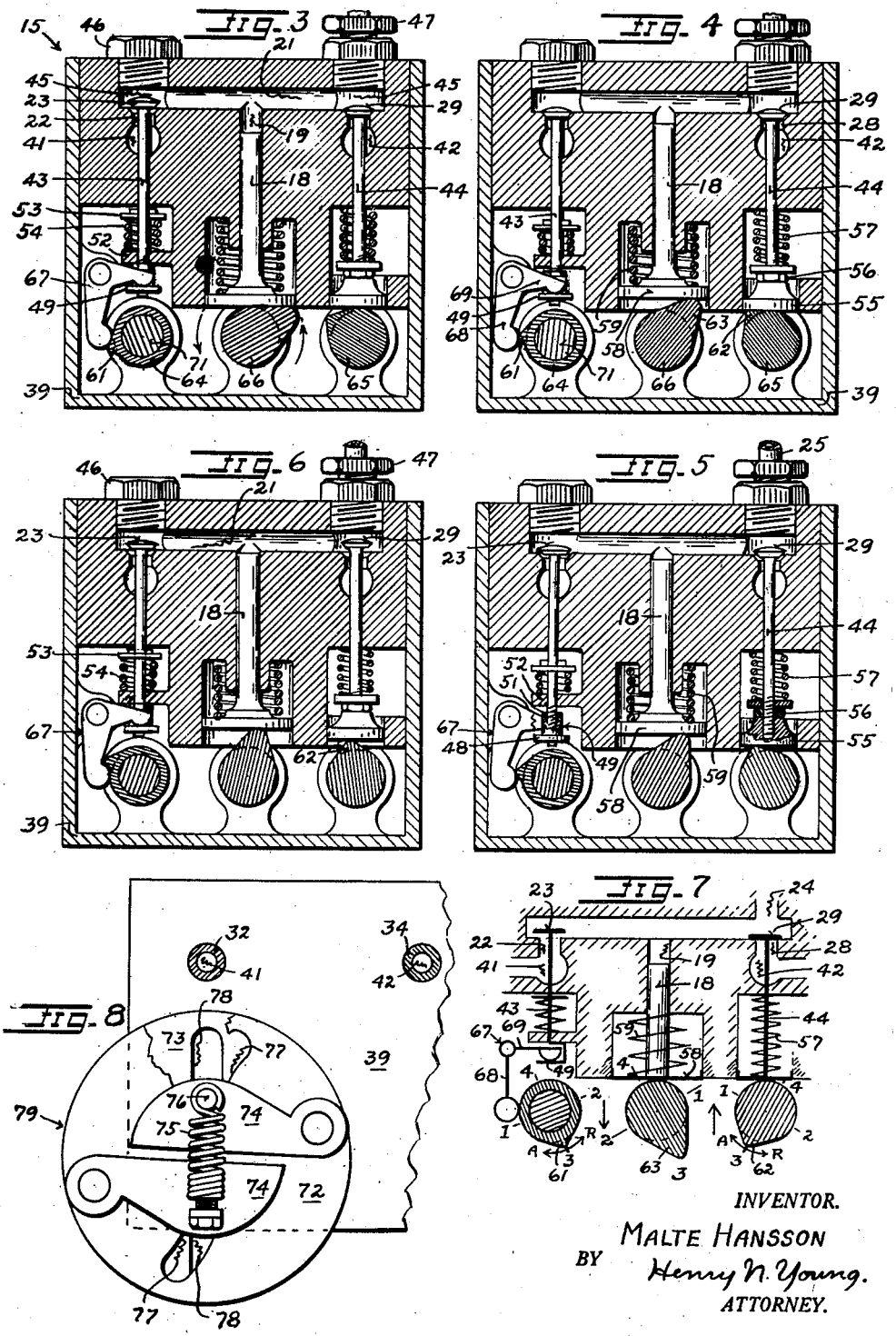

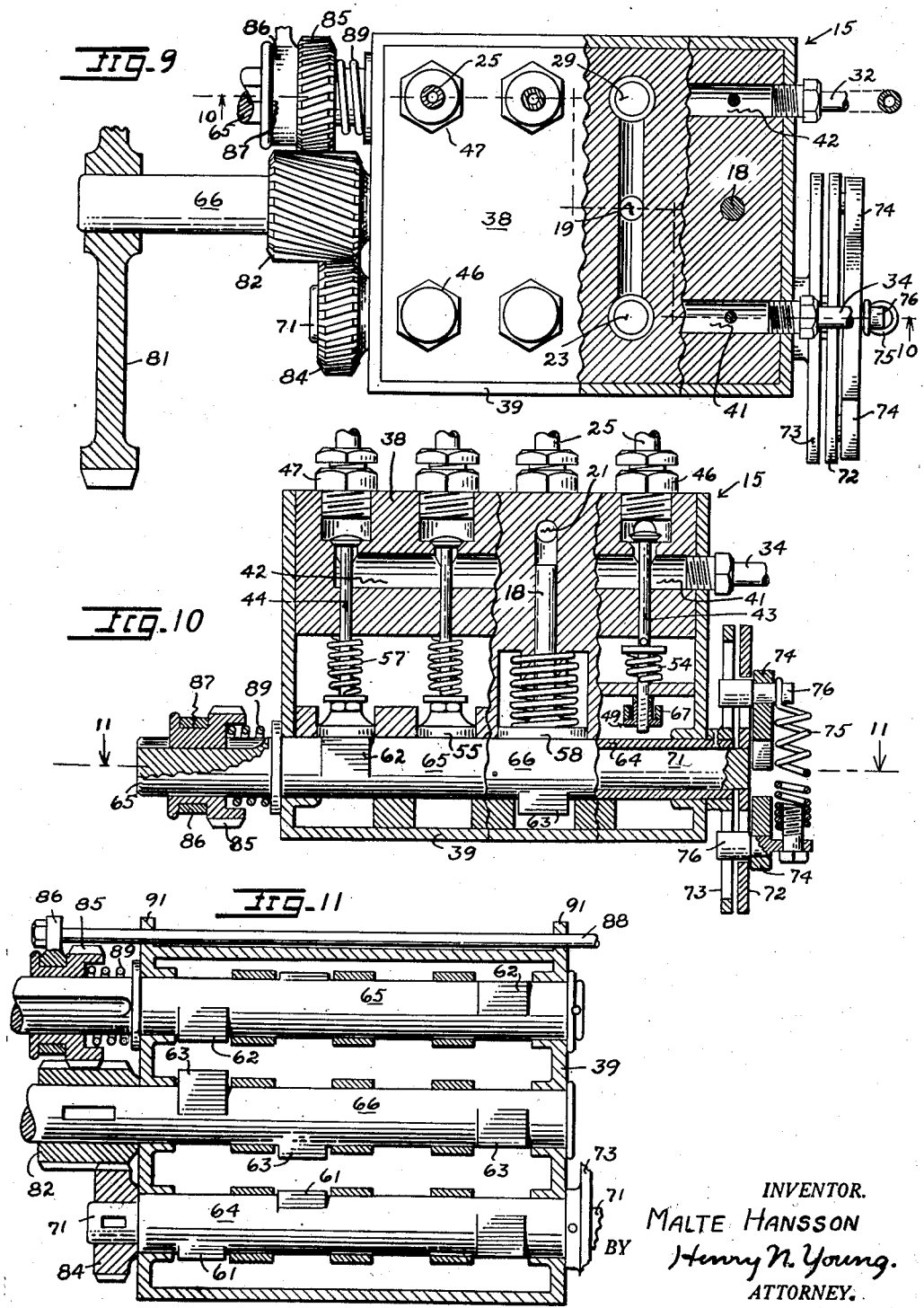

Patented Feb. 2, 1937

2,069,306

UNITED STATES PATENT OFFICE 2,069,306

FUEL INJECTION CONTROL

Malte Hansson, Alameda, Calif.

Application August 6, 1934, Serial No. 738,639

2 Claims. (Cl. 123—140)

The invention relates to a device for controlling the timing and quantity for fuel charges delivered to an internal combustion engine of the pressure injection type.

An object of the invention is to provide a method of injection control whereby the timing and quantity of a delivered fuel charge may be regulated to best meet varying speed and/or load conditions.

Another object is to provide a control means which is positive in operation and is automatic as to its regulating qualities with respect to desired speed and load conditions for the engine with which it is used.

A further object is to provide the control means in a pump unit which is adapted for operative association with engines of present and usual design without requiring any alterations or special adaptations of the engine structures.

An added object is to effect the desired control entirely in connection with the working chamber of the pump unit, and in such manner that a sharp cut-off is provided for the charges delivered to the engine by the pump unit.

The invention possesses other objects and features of advantage, some of which, with the foregoing, will be set forth or be apparent in the following description of a preferred embodiment of the invention, and in the accompanying drawings, in which, Figure 1 is a perspective view of a multi-cylinder internal combustion engine having a fuel control system embodying the present features of invention.

Figure 2 is a somewhat diagrammatic showing of the complete fuel control system as applied to one cylinder of the engine.

Figure 3 is an enlarged showing of a transverse section of an injection pump unit shown in Figure 2, the operative elements of the unit being shown as related at the beginning of the working stroke of a piston of the pump.

Figures 4 to 6 inclusive are similar to Figure 3 and show operative relations of pump elements at successive times in a working stroke of the pump piston.

Figure 7 is a somewhat diagrammatic showing of the operative parts of the pump unit and of the range of operative adjustment of valve actuating cams thereof.

Figure 8 is a fragmentary end view of the injector pump unit and shows a centrifugal governor of the unit.

Figure 9 is a plan, and partly sectional view of the pump unit.

Figure 10 is a stepped section taken through the unit at the broken line 10—10 in Figure 9.

Figure 11 is a plan section at 11—11 in Figure 10.

In internal combustion engines of the compression ignition type and designed for operation under different speed and load conditions, it is of primary importance that both the time and duration of the injection of a fuel charge always be such as to most efficiently utilize the fuel and insure a proper engine operation under a given set of operating conditions for the engine. As illustrated, and for meeting the foregoing requirements, an injection pump unit 15 is provided wherein the beginning and end of injection are both controlled for providing a multi-cylinder engine 16 with requisite charges of fuel at the best and corresponding times in the operative cycles of each cylinder 17 of the engine as shown in Figures 1 and 2 of the drawings.

The present pump unit 15 provides a separate pressure pump structure for each cylinder 17 of the engine for successive actuations in the order of firing for the cylinders, each pump including a piston 18 which is reciprocative in a cylinder bore 19 forming part of the working chamber 21 of the pump. The fuel is taken into the chamber 21 through an intake duct 22 which is controlled by a valve 23, and is arranged for discharge to the appropriate engine cylinder 17 through a duct 24 provided in part by a connecting pipe 25 which terminates at an injector nozzle 26 having its discharge controlled by a normally closed and spring-pressed valve 27, said valve being arranged to open to permit the flow of a charge to the engine cylinder 17 only when the pump discharge pressure reaches a predetermined and desired value. A return, or relief, duct 28 leads from the working chamber 21, and a valve 29 is operative in said duct.

As is particularly shown in Figure 2, fuel may be supplied at the intake duct 22 at a constant and relatively low pressure through a connecting pipe 32 which comprises the delivery pipe for a pump 31. The pump 31 is supplied with fuel from a reservoir (not shown) through a pipe 33, and the fuel discharged from the duct 27 is returned to the pipe 33 through a pipe 34. A constant discharge pressure is assured for the pump 32 through the provision of a by-pass duct 35 connecting the delivery and intake for the pump and having a pressure actuated relief valve 36 operative to open when a predetermined discharge pressure obtains in the delivery pipe 33.

It will now be noted that, with the liquid fuel filling the injector pump chamber 21 and the return valve 29 closed and the corresponding piston 18 making a working stroke in its cylinder 19, a closing of the intake valve 23 will thereafter cause the building up of a liquid pressure in the chamber 15 for effecting a discharge through the injector valve 27 and so into the engine cylinder 17 to be supplied. If, however, the valve 29 is opened while an injection pressure obtains in the chamber 21, the pressure in said chamber will promptly fall and injection will be sharply cut off, and it is such a timed operation of the valve 29 which is utilized in the present instance to control the quantity and termination of injection; for descriptive convenience, the valve 29 may hereinafter be referred to as a control valve or as a relief valve. The closing actuation of the intake valve 23 is preferably timed by a speed-controlled governor whereby its closing is advanced in the operating cycle of the pump as the engine speed increases; in this manner, a variable timing of the beginning of injection is effected. In view of the foregoing, it will be understood that the valves 23 and 27 and 29 are mutually co-active for determining the timing and quantity of a fuel charge to the engine, and that the specific device shown is designed to provide for such a fuel charge control.

In the disclosed embodiment of the injector pump 15, the pump pistons 18 and the valves 23 and 29 are mounted in a body block 38 which provides the working chambers 21 and is fixed in the top portion of a casing 39; in the present instance, the block 38 and casing 39 are each of rectangular outline. The pump cylinders lie in a central longitudinal and upright plane through the block and extend from the lower (inner) block face to transverse ducts provided within the block and comprising portions of the working chambers 21. Manifold ducts 41 and 42 extend longitudinally through the block at opposite sides of the aforesaid plane, said ducts each extending to a block end and being respectively arranged for connection with the supply and return pipes 32 and 34 which appropriately connect them with the pump 31.

The intake and return ducts 22 and 28 connect the chambers 21 with the manifold ducts 41 and 42 respectively, and the seats for the valves 23 and 29 are provided at the chamber ends of the former ducts, said valves being shown as poppet valves having their stems 43 and 44 extending downwardly through and from the block 38 for their actuation to control the valves in a manner to be hereinafter described. Discharge ducts extend upwardly from the chambers 21 for connection through the pipes 25 with the injector valves 27 of the engine, it being noted that the closed duct spaces provided in the pipes 25 and behind the valves 27 are always connected with a working chamber 21 as comprising an extension and part thereof.

As particularly shown, threaded bores 45 are provided in the block 38 in coaxial relation with each pair of valves 23 and 29, said bores extending from the chambers 21 to the top of the block and being large enough to provide for the insertion of the valves therethrough and the grinding of the valve seats. One of the bores 45 of a pair receives a sealing plug 46, while the other bore receives a tubular connector member 47 which connects the pipe 25 with the chamber 21. In the present instance, the bores 45 are alike whereby the plug 46 and connector 47 may be interchangeably mounted therein as may be desired or preferable.

At its free end, the stem 43 of the valve 23 is provided with a radial flange 48; as is brought out in Figures 5 and 11, the flange 48 is part of a member 49 which threadedly receives the stem end whereby the flange may be variably disposed along the stem for adjustably varying the spacing of the valve disc and the flange. A lock-nut 51 is mounted on the stem for engagement with the member 49 to secure the latter in adjusted position on the stem. Each stem 43 extends through a body extension 52 at a point of the stem adjacent the member 49 and carries a bearing ring 53 above the extension 52. An helical compression spring 54 encircles the stem and engages between the extension 52 and the ring 53 whereby the stem is constantly and resiliently urged upwardly to normally unseat its valve 23, this valve condition being particularly shown in Figures 2 and 3 and 6 and 7. The nut 51 may engage the under side of the extension 52 to limit the unseating movement of the valve 23.

A push plate member 55 of the valve is adjustably mounted at the lower extremity of each valve stem 44. As particularly brought out in Figure 5, the lower stem end extends into a threaded bore in the member 55 and a lock-nut 56 thereon engages the member to lock the member in adjusted position on the stem. An helical compression spring 57 encircles the stem 44 and is operative between the top of the member 55 and the bottom of the block where the stem 44 emerges whereby the valve 29 is normally and resiliently held seated, as is shown in Figures 2 and 3 and 4.

At its lower end, the piston 18 is provided with a push plate 58, and an helical compression spring 59 is constantly operative between the plate 58 and the block 38 to urge the piston to maintain a normally withdrawn position in its cylinder 19. As particularly illustrated, the push plates 55 and 58 are cylindric, and guide bores are provided in the lower block portion for slidably receiving and engaging these members.

It will now be noted that the valves 23 and 29 and the pistons 18 are arranged for displacement from their normal positions through the action of cams 61 and 62 and 63 which are periodically operative against the members 49 and 55 and 58 carried respectively on the valve stems 44 and 45 and each piston 18. As shown, mutually parallel and coplanar shafts 64 and 65 and 66 provide the respective cams 61 and 62 and 63, said cam shafts being journalled in suitable bearings provided in the casing 39. The cams 62 and 63 are arranged to constantly engage the push plates 55 and 55 and 58 of the piston 18 and the valve stem 45 respectively, whereby the cams serve as the sole stop means to limit the actions of the springs 57 and 59.

The cams 61 are each periodically operative to actuate a bell crank lever 67 which is pivotally mounted on the side wall of the casing 39 and has one arm 68 thereof arranged for engagement with a cam 61 of the shaft 64. The other lever arm 69 is preferably forked to span the member 49 and engage the upper side of the flange 48 of said member whereby a rocking of the lever by the action of the cam 61 is arranged to effect a closing movement of the valve 23.

It will now be noted that the cam shaft 64 is tubular, extends from the rearward end of the casing 39, and rotatably carries a shaft 71 within its bore. The shaft 71 extends outwardly from both ends of the casing and carries a disc 72 opposite the extending end of the shaft 64, and the latter shaft carries a disc 73 at its said end and opposite the disc 72. Like weight members 74 are pivoted at one end thereof to the disc 72 and at points of the disc adjacent its periphery. The weight members 74 are mutually coplanar and are connected by a tension spring 75 which extends diametrically of the discs. Pins 76 extend from the members 74 through registering slots 77 and 78 provided in the discs 72 and 73 respectively.

The slots 77 of the disc 72 are necessarily arcuate with their centers of curvature at the pivot points of the respective members 74, while the slots 78 are angularly related to the corresponding slots 77 whereby an arcuate movement of a pin 76 is operative against an edge of the slot 78 which it engages to effect a relative rotation of the shafts 64 and 71. It will now be understood that the described arrangement comprises a centrifugal governor 79 for automatic operation to adjust the relation of the shaft 64 to the shaft 71 in accordance with the speed of rotation of the shafts, whereby, as the rotative speed increases, the weight members 74 move outwardly by centrifugal force and against the increasing resistance of the spring 75 to thereby advance the action of the cams 61 on the shaft 64 with respect to the cams on the shaft 65. If the speed decreases, the spring 75 operates to retard the cam action to a point where an effective centrifugal force on the weights 74 again equals the spring resistance.

The cam shaft 66 extends forwardly from the casing 39 and carries gears 81 and 82 at its protruding end. When the unit 15 is operatively associated with an engine, as the engine 16, the gear 81 is arranged for driven connection with the crankshaft of the engine through suitable gearing 83 and for rotation at half the rate of the crankshaft whereby the shaft 66 is arranged to make one revolution for each four-stroke cycle of each engine cylinder. The gear 82 is an elongated spiral gear and meshes with a spiral gear 84 of like diameter fixed on the adjacent protruding end of the shaft 71 whereby the latter shaft may be driven at the same rotative speed as the shaft 66 and in synchronism therewith.

The cam shaft 65 also extends forwardly from the casing 39, and its forward end mounts a spiral gear 85 which meshes with the gear 82 and has the same diameter as the latter gear. The gear 85 is splined to the shaft 65 for sliding adjustment therealong whereby its movement along the shaft is operative to advance or retard the operation of the cams 62 thereon with respect to the cams 63 of the shaft 66 while this gear engages the gear 82. As shown, a shift collar 86 engages in a complementary groove 87 provided at an end of the gear 85, and a shift rod 88 extends from the collar for actuation and a suitable setting thereof to adjust the positioning of the gear 85 along the shaft 65. The rod 88 is particularly shown as mounted in eyes 91 extending laterally from the casing 39 whereby it may extend along and rearwardly of the pump unit for actuation by any suitable means. A compression spring 89 is coactive between the gear 85 and a collar on the cam shaft 65 rearwardly of said gear whereby the gear is constantly urged forwardly to advance the operation of the cams on the shaft.

By reference to Figure 3, it will be noted that a set of cams 62 and 61 and 63 is there shown in mutually cooperative positions for operating the pump piston 18 and the intake valve 23 and the control valve 29 in the previously indicated order, the cam 62 engaging the push plate 58 of the piston 18 for the beginning of a working stroke of the piston. Under the latter condition the intake valve 23 is open and the control valve 29 is closed, these disposals of the valves being, for descriptive convenience, referred to as normal. The specific relation of the cams may be considered as that for normal speed and load conditions for the engine.

In Figure 4 the cam 62 has been rotated to dispose the pump piston in a substantially halfstroke position thereof, and the intake valve 23 has been closed. Since the control valve 29 is still closed, an injection discharge would be taking place from the working chamber 21 until the control valve 29 is opened. It will be noted that the pressure in the chamber 21 would prevent an opening of the closed valve 23, even if the position of the cam 61 might permit it, until the discharge pressure is relieved by opening the valve 29.

At about three-fourths of the working stroke of the piston 18, the valve 29 has begun to open by the action of the cam 62, and the valve 23 has also begun to open, the latter occurring as soon as the chamber pressure is low enough to permit the spring 54 and the supply pressure of the pump 31 to jointly act; the present relation is indicated in Figure 5.

At about seven-eighths of the working stroke of the piston 18, the valves 23 and 29 are both open, as is indicated in Figure 6, it being noted that the further rotation of the cam 63 to permit a seating of the valve 29 must be completed before the valve 29 may close. It will be understood, however, that the positive and relatively low supply pressure of the pump 31 will keep the working chamber 21 full of fuel while the valve 29 is closing and/or a return stroke of the piston is occurring.

It will now be noted that if the engine speed increases, the increased rotative speed of the shaft 71 will, through the action of the described governor 79, cause the advancement of the operation of the cam 61 with respect to the pump piston operating cam 62 whereby the beginning of injection through the injector valve 27 will be advanced. Similarly, a slowing down of the engine will retard the action of the cam 61 and injection will begin at a later time in the operative cycle of the engine piston and the pump piston 18. It will thus be understood that the beginning of injection is automatically controlled solely by the action of the governor 79 to regulate the closing of the valve 23.

The valve 23 might be first closed at the beginning of a working stroke of the piston 18 through an appropriate advancing of the action of the cam 61. On the other hand, the valve 23 might be first closed at the end of the piston stroke whereby no injection pressure would be generated in the working chamber 21 even with the valve 29 closed. In the present instance, the working rotation of the piston-operating cam 63 is approximately sixty degrees whereby the complete range of adjustment of the cam 61 by means of the governor 79 is limited to sixty degrees in practice, and might be less. In the diagrammatic showing of Figure 7, the aforesaid possible degrees of advance and retard of the cam 61 with respect to its disclosed setting are respectively indicated by the letters A and R in association with direction arrows.

Respecting an advancing or retarding of the opening of the valve 29 through adjustment of the relative relations of the cams 62 and 63, the theoretical limits thereof in terms of a beginning of a valve opening are at the beginning and the end of a working stroke of the pump piston 18, whereby the range of possible adjustment of the cams 62 as effected by axial adjustment of the gear 85 along the cam shaft 66, may also be sixty degrees; this possible range of adjustment is indicated in the showing of Figure 7 by the appropriate use of the letters A and R in association with direction arrows.

In the drawings, the engine 16 is represented as having four cylinders and a firing order of 1—3—2—4, and the positioning of the various cams of the pump unit 15 is shown accordingly. The transverse sectional views of Figures 3 to 6 are assumed to be taken for the forward, or first, cylinder fuel injection pump of the unit 15. Figures 2 and 7 show the coincident cam positions for the third cylinder, and in Figure 7 the coincident cam positions for all four cylinders are indicated at the numbers 1 to 4 inclusive. The settings of the cams on each cam shaft are, of course, ninety degrees apart in the order of firing of the engine.

Assuming the engine 16 to be operating with the valve-operating cams 61 and 62 in the disclosed operative relations to the piston-operating cams 63, the engine speed may be increased by retarding the action of the cams 62 to delay the opening of the valves 29 whereby the quantity of fuel injected will be increased. As the engine speeds up through the increased fuel supply, the cams 61 will be automatically advanced to advance the beginning of injection and further increase the fuel charge to the engine. When the desired speed is reached, the cams 62 may be retarded through an appropriate actuation of the shift rod 88 to hold the engine at the desired speed.

In the case of an engine load increase at the same speed, the cams 62 would be rotated to appropriately increase the charge for maintaining the speed. It will thus be understood that all necessary manual regulation of the engine operation is effected solely through advancing or retarding the action of the valves 29 through an appropriate manipulation of the shift rod 88, and that said rod replaces the usual fuel throttle rod for controlling the charge delivered to an engine cylinder. It is to be noted, however, that the rate of flow of a charge to the engine is not affected in the present method of control, and that only the duration of injection controls the quantity of a delivered charge whereby the ignition time is longer for a bigger charge. The present control device is understood to be particularly advantageous when applied to engines which are designed for the propulsion of vehicles for which the speed and load requirements may vary widely.

From the foregoing description taken in connection with the accompanying drawings, the advantages of the construction and method of operation will be readily understood by those skilled in the art to which the invention appertains. While I have described the features and the principle of operation of a device which I now consider to be a preferred embodiment of my invention, I desire to have it understood that the showing is primarily illustrative, and that such changes may be made, when desired, as fall within the scope of the following claims.

I claim:

1. In a pump for effecting an intermittent delivery of liquid charges therefrom, means providing a closed working chamber having intake and delivery and relief passages therefor, a normally withdrawn displacement piston for intermittent operative projection into said chamber, means constantly and yieldingly operative to urge a withdrawn disposal of said piston, a valve operative in said intake passage, means constantly and yieldingly operative to urge the opening of said intake valve, a valve operative in said relief passage, means constantly and yieldingly operative to urge the closing of said relief valve, simultaneously operative and different cam shafts providing cams for periodically actuating said piston and valves during a rotation of the shafts whereby the intake valve is arranged to be temporarily closed solely during a working stroke of the piston and the relief valve is arranged to be opened while the intake valve is closed, mutually engaged spiral gears connecting the relief-valve-operating shaft with the piston-operating shaft and arranged for a relative axial shifting thereof whereby to adjustably vary the timing of the opening of the relief valve with respect to the operative actuation of the piston while the connected shafts are actuated at like rotative speeds, means manually operative for effecting a relative adjustment of one said spiral gear with respect to the other, and means connecting the intake-valve-operating shaft with the piston-operating shaft for the operation of these shafts at like speeds.

2. A structure in accordance with claim 1 wherein the last-named means comprises an auxiliary shaft, means connecting the latter shaft with the piston-operating shaft for rotation in synchronism therewith, and a speed-governed device carried by the auxiliary shaft and cooperative with the intake-valve-operating shaft in such manner that the latter shaft is arranged to be rotatively and automatically advanced with respect to the piston-operating shaft as the rotative speed of the shafts increases.

MALTE HANSSON.